United States Patent
Ryu et al.

(10) Patent No.: US 9,151,869 B2
(45) Date of Patent: Oct. 6, 2015

(54) LIQUID CRYSTAL FILM

(75) Inventors: Su Young Ryu, Daejeon (KR); Moon Soo Park, Daejeon (KR); Jun Won Chang, Daejeon (KR); Sin Young Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 16 days.

(21) Appl. No.: 13/358,350

(22) Filed: Jan. 25, 2012

(65) Prior Publication Data

US 2012/0212692 A1 Aug. 23, 2012

(30) Foreign Application Priority Data

Jan. 25, 2011 (KR) .................. 10-2011-0007439
Jan. 25, 2012 (KR) .................. 10-2012-0007315

(51) Int. Cl.
*C09K 19/00* (2006.01)
*G02B 1/04* (2006.01)
*G02B 5/30* (2006.01)
*G02F 1/13363* (2006.01)

(52) U.S. Cl.
CPC ............. *G02B 1/04* (2013.01); *G02B 5/3016* (2013.01); *G02B 5/3025* (2013.01); *G02F 2001/133633* (2013.01); *Y10T 428/1005* (2015.01); *Y10T 428/1059* (2015.01)

(58) Field of Classification Search
CPC ...... G08B 1/04; G02B 5/3025; G02B 5/3033; G02B 5/3016; C08L 101/12; Y10T 428/10; Y10T 428/1005; Y10T 428/1059; Y10T 428/1077; Y10T 428/1082; G02F 1/13363; G02F 1/133711; G02F 1/13378; G02F 1/133788; G02F 2001/133633
USPC ................ 428/1.2, 1.3, 1.33, 1.5, 1.54, 1.55; 349/123, 134, 135, 117, 96; 427/508, 427/162

See application file for complete search history.

(56) References Cited

U.S. PATENT DOCUMENTS

| | | | | |
|---|---|---|---|---|
| 2003/0211346 A1* | 11/2003 | Kausch | ......................... | 428/483 |
| 2009/0066883 A1* | 3/2009 | Kondou | ......................... | 349/75 |
| 2010/0296032 A1* | 11/2010 | Shin et al. | ....................... | 349/96 |

FOREIGN PATENT DOCUMENTS

| | | |
|---|---|---|
| JP | 2010-164975 | 7/2010 |
| KR | 10-2009-0105973 A | 10/2009 |
| KR | 10-2009-0119285 A | 11/2009 |
| WO | WO 2005063472 A1 * | 7/2005 |

* cited by examiner

*Primary Examiner* — Ruiyun Zhang
(74) *Attorney, Agent, or Firm* — McKenna Long & Aldridge, LLP

(57) ABSTRACT

A liquid crystal film, a method for manufacturing the same, a polarizing plate, and a liquid crystal display are provided. The liquid crystal film has excellent physical properties such as durability and an optical physical property so that it can be effectively used for various applications. In addition, the physical property of the liquid crystal film can be controlled according to desired purposes.

15 Claims, 1 Drawing Sheet

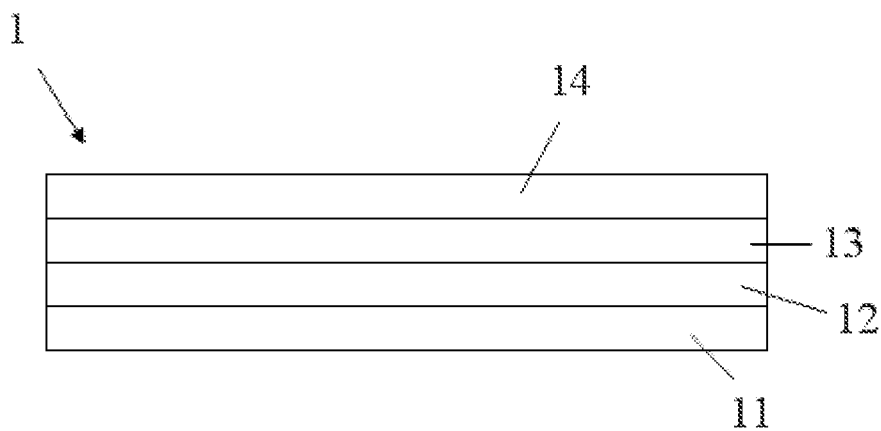

LIQUID CRYSTAL FILM

This application claims the benefit of Korean Patent Application Nos. 10-2011-0007439, filed in Korea on Jan. 25, 2011, and 10-2012-0007315, filed in Korea on Jan. 25, 2012, which are hereby incorporated by reference for all purposes in their entirety as if fully set forth herein.

BACKGROUND

1. Field of the Invention

The present invention relates to a liquid crystal film, a method for manufacturing the same, a polarizing plate, and a liquid crystal display.

2. Discussion of Related Art

There is a continuously increasing demand for a thinner, lighter and wider liquid crystal display (LCD), plasma display panel (PDP) and the like. Also, it is required to improve screen uniformities, contrast ratios, and viewing angles in order to realize a high quality image.

In a display, an optical film, such as a retardation film or a viewing angle-compensation film, may be used to decrease changes in color, to secure a viewing angle, and to improve brightness.

A liquid crystal film using optical anisotropy of a liquid crystal film manufactured by curing polymerizable liquid crystal compounds is known as an optical film.

Liquid crystal molecules may be divided into rod-like liquid crystals and disc-like liquid crystals according to their shapes. There are various alignments of the rod-like liquid crystals, which include homogeneous, homeotropic, tilted, splay, and cholesteric alignments, and the like. Accordingly, the liquid crystal film may have various optical properties that cannot be obtained from an oriented film. For example, a wider variety of physical properties can also be secured by coating polymerizable liquid crystal compounds on the oriented film and then realizing various alignments of the liquid crystal compounds.

The liquid crystal film may be manufactured by forming an alignment layer by applying an alignment agent, such as polyimide or poly(vinyl alcohol), on a substrate; giving an aligning property by rubbing the alignment layer in a predetermined direction; and applying and then aligning polymerizable liquid crystal compounds. However, since the rubbed alignment layer is deficient in an adhesive strength to a liquid crystal layer, there are problems in that the liquid crystal layer is delaminated or contracted under the severe environment, such as a high temperature or high humidity environment. There are also problems in a rubbing process, which are static electricity or scratching which may easily occur due to friction according to a rubbing method and fine dust generated from a rubbing cloth.

In order to solve the problems caused by the rubbing method, a non-contacting alignment method is known, and a photo-aligning method using light irradiations is known as an example thereof. Photo-aligning methods include a method of using a photodimerization reaction of a cinnamate moiety, a coumarin moiety, a chalcone moiety, and the like, a method of using a photoisomerization reaction of a polymer including an azobenzene moiety, a method of using a photodissociation reaction of a polyimide polymer, and the like.

However, according to the above methods, there are still problems in that the alignment layer may have poor heat-stability or photo-stability and contamination may be caused by decomposition products or un-reactive materials.

In addition, the alignment layer is generally formed on a plastic substrate in order to manufacture a retardation film, a viewing angle compensation film or a brightness enhancement film using the polymerizable liquid crystal compounds. However, there is a problem in that a type of a usable substrate is limited in the photo-aligning method. For example, a photo-alignment layer is manufactured by forming an alignment layer by applying a coating solution, which is prepared by dissolving a photo-alignable polymer in a solvent, to a substrate, and then performing aligning through irradiation of light. However, since it is common for a plastic substrate to be easily corroded by a solvent, the substrate has a high probability of incurring damage in a process of manufacturing an alignment layer. When the plastic substrate is damaged in the process of manufacturing the photo-alignment layer, entire physical properties of the film may be deteriorated.

In addition, the plastic substrate may be swelled by a solvent in the process of manufacturing the alignment layer and thus the swelling phenomenon may also decrease the physical properties of the film. For example, when the substrate may be swelled in the process of manufacturing the alignment layer, there may be a lack of cross-linking of the alignment layer according to a level of UV irradiation. The lack of the cross-linking of the alignment layer as described above may cause dissolving and/or swelling again which may be induced by a solvent used to coat a liquid crystal in order to form the liquid crystal layer and thus an orientational property of materials in the alignment layer may be affected. As a result, the aligning property of the liquid crystal may be decreased.

In addition, LCDs are classified into various modes, including twisted nematic (TN), super twisted nematic (STN), vertical alignment (VA), and in-plane switching (IPS) modes according to the ordering of liquid crystal molecules in a liquid crystal panel. Each liquid crystal panel has an intrinsic ordering of liquid crystals and thus there are optical anisotropy differences between the liquid crystal panels.

Accordingly, to compensate the optical anisotropy of the liquid crystal panel, a film having optimized optical physical properties needs to be developed according to a type of the liquid crystal panel.

SUMMARY OF THE INVENTION

The present invention provides a liquid crystal film, a method for manufacturing the same, a polarizing plate, and an LCD.

One illustrative liquid crystal film may include a substrate; a protective layer for the substrate presented on the substrate; an alignment layer presented on the protective layer for the substrate; and a liquid crystal layer presented on the alignment layer. The alignment layer may include a photo-alignable polymer. In addition, the liquid crystal layer may include liquid crystal molecules.

FIG. 1 shows a schematic of an illustrative embodiment of a liquid crystal film 1, in which a substrate 11, a protective layer for the substrate 12, an alignment layer 13, and a liquid crystal layer 14 are sequentially formed.

Examples of the substrate in the liquid crystal film, as a plastic substrate, may include a substrate formed from cellulose such as triacetyl cellulose (TAC) or diacetyl cellulose (DAC); a substrate formed from cyclic olefin polymer (COP) such as norbornene derivative; a substrate formed from acrylic material such as poly(methyl methacrylate) (PMMA); a substrate formed from polycarbonate (PC); a substrate formed from polyolefin such as polyethylene (PE) or polypropylene (PP); a poly(vinyl alcohol) (PVA) substrate; a poly(ether sulfone) (PES) substrate; a poly(etheretherketone) (PEEK) substrate; a poly(etherimide) (PEI) substrate; a poly (ethylene naphthalate) (PEN) substrate; a substrate formed from polyester such as poly(ethylene terephthalate) (PET); a polyimide (PI) substrate; a polysulfone (PSF) substrate; or a substrate formed from fluoro polymer such as amorphous fluoro polymer; and the like. In one embodiment, the polycarbonate substrate may be used as the substrate of the liquid crystal film.

The protective layer for the substrate may prevent erosion and swelling of the substrate from being generated in a process of manufacturing the alignment layer, and may be formed by any material having the above properties. In one embodiment, the protective layer for the substrate may be a layer of an inorganic compound, such as an oxide or a fluoride of, for example, Si, Al, Mg or Zr; a layer including water-soluble polymer, such as poly(vinyl alcohol), poly(ethylenevinyl alcohol) copolymer or dextrin; or a layer including a crosslinking product of polyorganosiloxane, acryl-silicone compound, acrylic compound such as acrylic oligomer or acrylic polymer or polyurethane, and the like.

In one embodiment, the protective layer for the substrate may include polymer. Examples of the polymer included in the protective layer for the substrate may include, but are not limited to poly(vinyl alcohol), polyurethane, a poly(vinyl alcohol) copolymer, water-soluble acrylate polymer, poly(ethylene glycol), poly(ethylene vinyl alcohol) copolymer, dextrin, poly(vinyl pyrrolidone), cellulose derivative, vinyl pyrrolidone-vinyl acetate copolymer, and the like. The above-described polymer may be included in the protective layer for the substrate in crosslinked or non-crosslinked forms. The protective layer for the substrate may include the above polymer as a main component. The term "including as a main component" as used herein may refer to including the polymer in an amount of at least 70 weight %, at least 75 weight %, at least 80 weight %, at least 85 weight %, or at least 90 weight %.

In one embodiment, water-soluble polymer may be used as the polymer included in the substrate. The term "water-soluble polymer" as used herein may refer to a polymer that has solubility in polar solvent such as water of at least 1 weight %, at least 10 weight %, at least 20 weight %, at least 30 weight %, at least 40 weight %, at least 50 weight %, or at least 60 weight %.

The water-soluble polymer among the polymers listed above may be poly(vinyl alcohol). The poly(vinyl alcohol) may be obtained from gelation of poly(vinyl acetate). As the poly(vinyl acetate), a homopolymer of vinyl acetate; a copolymer of vinyl acetate and another monomer capable of being copolymerized therewith may be used. An example of the monomer capable of being copolymerized with vinyl acetate may be, but is not limited to, one or a mixture of at least two of unsaturated carboxylic acids, olefins, unsaturated sulfonic acids, acrylamides having an ammonium group. A degree of gelation of the poly(vinyl alcohol) may generally be approximately 85 mol % to 100 mol %, or at least 98 mol %. The poly(vinyl alcohol) may be further modified, and for example, may be poly(vinyl formal) or poly(vinyl acetal), which are modified with an aldehyde.

In one embodiment, the protective layer for the substrate may include polymerized multifunctional acrylate compounds, i.e., a polymerized product of multifunctional acrylate compounds. The term "multifunctional acrylate compound" as used herein may refer to a compound including at least two of acrylic groups or methacrylic groups.

The multifunctional acrylate may be, for example, a difunctional acrylate, such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, hydroxypivalic acid neopentyl glycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecanedimethanol (meth)acrylate, dimethylol dicyclopentane di(meth)acrylate, ethyleneoxide-modified hexahydrophthalic acid di(meth)acrylate, tricyclodecane dimethanol (meth)acrylate, neopentylglycol-modified trimethylpropane di(meth)acrylate, adamantane di(meth)acrylate, or 9,9-bis[4-(2-acryloyloxyethoxy)phenyl]fluorine; a trifunctional acrylate, such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane (meth)acrylate, or tris(meth)acryloxyethylisocyanurate; a tetrafunctional acrylate, such as diglycerin tetra(meth)acrylate, or pentaerythritol tetra(meth)acrylate; a pentafunctional acrylate, such as propionic acid-modified dipentaerythritol penta(meth)acrylate; or a hexafunctional acrylate, such as dipentaerythritol hexa(meth)acrylate, caprolactone-modified dipentaerythritol hexa(meth)acrylate, or urethane (meth)acrylate (for example, a reaction product of trimethylolpropane tri(meth)acrylate and an isocyanate monomer). Also, a various compound such as urethane acrylates, polycarbonate acrylates, polyester acrylates, polyether acrylates, epoxy acrylates, and the like, which is known as a so-called photo-curable oligomer in the field, may be used if necessary.

One or a mixture of at least two selected from the above described multifunctional acrylate compounds may be used, and the tri to hexa-functional acrylate compounds may be preferably used in an aspect of realizing durability, but it is not limited thereto.

The layer including the polymerized multifunctional acrylate compounds may be manufactured by applying a solution prepared by mixing the multifunctional acrylate compound along with a suitable radical initiator, for example, a photo-initiator, and then inducing a polymerization reaction through UV irradiation.

In one embodiment, the protective layer for the substrate may include both of the water-soluble polymer and the polymerized product of the multifunctional acrylates. In this case, the protective layer for the substrate may include 1 to 300 parts by weight, 1 to 200 parts by weight, 1 to 150 parts by weight, 1 to 100 parts by weight, 10 to 100 parts by weight, 20 to 100 parts by weight, 30 to 100 parts by weight, 30 to 90 parts by weight, or 30 to 80 parts by weight of the multifunctional acrylate relative to 100 parts by weight of the water-soluble polymer.

Unless otherwise specifically defined, the unit "part by weight" used herein may refer to a weight ratio.

The protective layer for the substrate as described above may be formed to have a proper thickness considering a desired protective property.

The alignment layer on the protective layer for the substrate in the liquid crystal film may include a photo-alignable polymer. In one embodiment, the alignment layer may be a reaction product of the mixture including the photo-alignable polymer, and for example, may be obtained by reaction induced by irradiating the mixture with light, for example, polarized ultraviolet rays.

The term "photo-alignable polymer" as used herein may refer to a compound capable of being aligned by a photoisomerization reaction, photolysis, or a photodimerization reaction by, for example, light irradiation and then exhibiting a liquid crystal aligning property. For example, the photo-alignable polymer may exhibit the liquid crystal aligning property through the photodimerization reaction by being irradiated with the polarized ultraviolet rays.

The term "liquid crystal aligning property" as used herein may refer to a property for the alignment layer, the photo-alignable polymer or the reaction product of the polymer to be capable of aligning a liquid crystal molecule, a liquid crystal compound or a precursor thereof adjacent thereto along a predetermined direction.

Various photo-alignable polymers are known in the art, and any of the polymers may be used in the liquid crystal film.

In one embodiment, the photo-alignable polymer may be a norbornene photo-alignable polymer having a cinnamate moiety, or may be a photo-alignable polymer including a unit of the following Formula 1 or Formula 2:

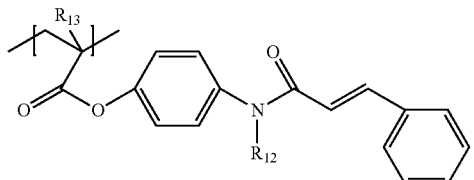

[Formula 1]

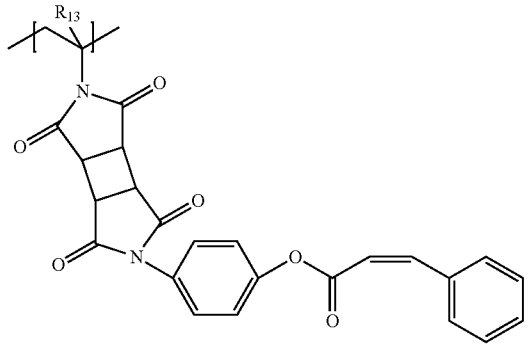

[Formula 2]

In Formulas 1 and 2, $R_{12}$ and $R_{13}$ are independently hydrogen or an alkyl group.

The unit represented by the above Formula 1 or 2 may be substituted with at least one substituent.

Unless otherwise specifically defined, the term "alkyl group" as used herein may refer to an alkyl group having 1 to 20, 1 to 16, 1 to 12, 1 to 8 or 1 to 4 carbon atoms. The alkyl group may be a linear, branched or cyclic structure, and may be optionally substituted with at least one substituent.

In the specification, the functional group that may be optionally substituted with a certain substituent or compound may be, or for example, a halogen, a hydroxyl group, an epoxy group, an acryloyl group, a methacryloyl group, an isocyanate group, a thiol group, an alkoxy group, an alkyl group, an alkenyl group or an aryl group, but it is not limited thereto.

In addition, unless otherwise specifically defined, the term "alkoxy group" as used herein may refer to an alkoxy group having 1 to 20, 1 to 16, 1 to 12, 1 to 8 or 1 to 4 carbon atoms. The alkoxy group may be a linear, branched or cyclic structure, and may be optionally substituted with at least one substituent.

Unless otherwise specifically defined, the term "alkenyl group" as used herein may refer to an alkenyl group having 2 to 20, 2 to 16, 2 to 12, 2 to 8 or 2 to 4 carbon atoms. The alkenyl group may be a linear, branched, or cyclic structure, and may be optionally substituted with at least one substituent.

Unless otherwise specifically defined, the term "aryl group" as used herein may refer to a monovalent moiety derived from a compound including a benzene or a structure in which at least two benzenes are condensed or bound, or a derivative thereof. The aryl group may be, for example, an aryl group having 6 to 22, 6 to 16 or 6 to 13 carbon atoms, which may be a phenyl group, a phenyl ethyl group, a phenyl propyl group, a benzyl group, a tolyl group, a xylyl group or a naphthyl group, and the like.

The photo-alignable polymer may have a number average molecular weight of approximately 10,000 g/mol to approximately 500,000 g/mol. The term "number average molecular weight" or "weight average molecular weight" as used herein may refer to a value measured by gel permeation chromatography (GPC), for example, a converted value with respect to standard polystyrene.

In one embodiment, the photo-alignable polymer may be a norbornene photo-alignable polymer including a cinnamate moiety. The photo-alignable polymer may include, for example, a unit represented by the following Formula 3:

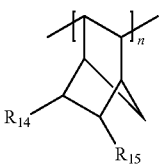

[Formula 3]

In the Formula 3, n is a number from 50 to 5,000; $R_{14}$ and $R_{15}$ are independently hydrogen, a halogen, an alkyl group, or a moiety represented by the following Formula 4, with the proviso that at least one of $R_{14}$ and $R_{15}$ is a moiety represented by the following Formula 4.

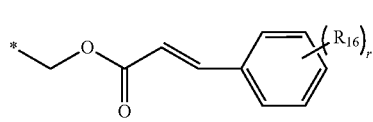

[Formula 4]

In Formula 4, $R_{16}$ is independently hydrogen, a halogen, an alkyl group, an alkoxy group, or an alkenyloxy group; r is a number of $R_{16}$ substituted in the benzene ring and is a number from 1 to 5.

In Formula 4, the mark "*" may indicate that the marked part is connected to Formula 3.

In Formula 3, the "n" may be, for example, a number from 50 to 3,000 or from 50 to 1,500.

In addition, $R_{14}$ and $R_{15}$ in Formula 3 are independently hydrogen, an alkyl group, or a moiety represented by the above Formula 4, but at least one of them may be a moiety represented by Formula 4. In another embodiment, $R_{14}$ and $R_{15}$ may be hydrogen, an alkyl group having 1 to 6 carbon atoms or a moiety represented by Formula 4, but at least one of them may be a moiety represented by Formula 4.

In addition, $R_{16}$ in the above Formula 4 may be, for example, hydrogen, a halogen, an aryloxy or an alkoxy group, or hydrogen, chlorine, bromine, an allyloxy, or an alkoxy having 1 to 6 carbon atoms. In another embodiment, $R_{16}$ may be hydrogen, or an alkoxy having 1 to 6 carbon atoms.

The photo-alignable polymer including the unit of Formula 3 may be, for example, polynorbornene cinnamate, polynorbornene alkoxy cinnamate, polynorbornene allyloyloxy cinnamate, polynorbornene fluorinated cinnamate, polynorbornene chlorinated cinnamate or polynorbornene dicinnamate, but it is not limited thereto.

In one embodiment, the photo-alignable polymer including the unit of Formula 3 may include at least one of the units represented by the following Formulas 5 to Formula 10, but it is not limited thereto:

[Formula 5]

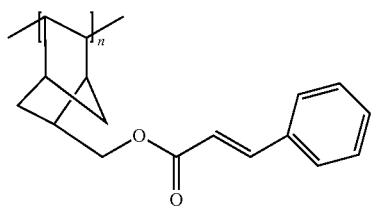

[Formula 6]

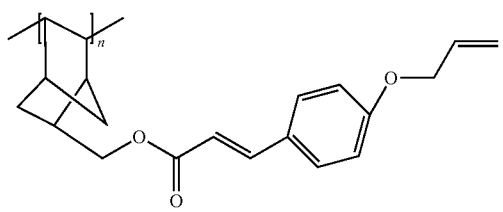

[Formula 7]

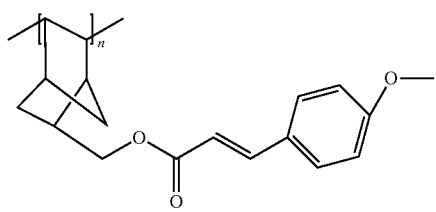

[Formula 8]

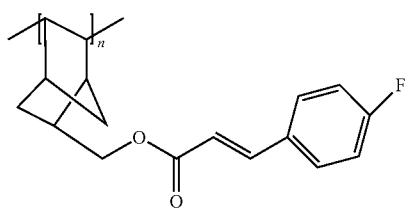

[Formula 9]

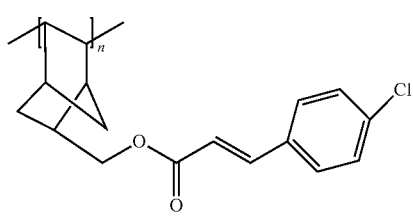

-continued

[Formula 10]

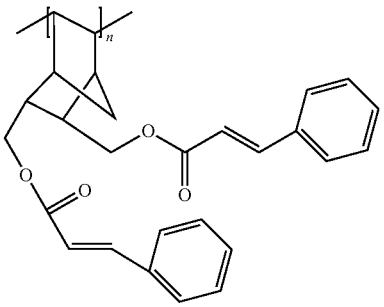

In Formulas 5 to 10, n is the same as defined in Formula 3.

The mixture for forming the alignment layer may further include a reactive compound having at least one functional group capable of reacting with the photo-alignable polymer. The reactive compound may include at least 2, 2 to 10, 4 to 10, or 4 to 8 functional groups capable of reacting with the photo-alignable polymer. The functional group may have reactivity with liquid crystal molecules of the liquid crystal layer or a precursor for forming the liquid crystal molecules.

The reactive compound may induce an additional reaction in the mixture, which is independent of the reaction performed in order for the photo-alignable polymer to exhibit the liquid crystal aligning property, for example, the photodimerization reaction, in a process of irradiating the mixture with light for forming the alignment layer or the liquid crystal layer. In addition, an average tilt angle of the liquid crystal molecules in the liquid crystal layer may be controlled by regulating a weight ratio of the reactive compound and the photo-alignable polymer in the mixture.

The additional reaction may include a cross-linking reaction between the photo-alignable polymers, a cross-linking reaction between the photo-alignable polymer and the reactive compound or between the liquid crystal molecule and the reactive compound, a cross-linking reaction between the photo-alignable polymer and the liquid crystal molecule, and the like.

For example, the functional group capable of reacting with the photo-alignable polymer and/or the liquid crystal molecule as described above may be a functional group capable of being cross-linked with the photo-alignable polymer and/or the liquid crystal molecule by a free radical reaction and may be a functional group such as an ethylenically unsaturated double bond.

An example of the functional group may include one or at least two of an alkenyl group, an epoxy group, a cyano group, a carboxyl group, an acryloyl group, a methacryloyl group, and the like. The functional group may be a vinyl group, an allyl group, an acryloyl group, or a methacryloyl group, or an acryloyl group or a methacryloyl group, but it is not limited thereto.

In one embodiment, the reactive compound may have at least one, at least two, 2 to 10, 4 to 10, or 4 to 8 functional groups, and a molecular weight or a weight average molecular weight of 200 to 5,000, preferably 200 to 1,000. Within the above-described number of the functional group and the above range of the molecular weight or the weight average molecular weight, the compound may properly induce the additional reaction, and also may maintain the liquid crystal aligning property of the photo-alignable polymer and therefore may improve durability of the liquid crystal film. In addition, within the above-described number of the functional group and the above range of the molecular weight or the weight average molecular weight, the compound may effectively regulate an average tilt angle of the liquid crystal molecules in the liquid crystal layer while maintaining the liquid crystal aligning property of the photo-alignable polymer.

The reactive compound may include, for example, an alkyl (meth)acrylate such as methyl (meth)acrylate, ethyl (meth) acrylate, N,N-dimethylaminoethyl (meth)acrylate or 2-(2-oxo-imidazolidinyl)ethyl (meth)acrylate; a hydroxyalkyl (meth)acrylate such as hydroxyethyl (meth)acrylate or hydroxypropyl (meth)acrylate; an alkoxyalkyl (meth)acrylate such as methoxyethyl (meth)acrylate; a carboxyalkyl (meth)acrylate such as carboxyethyl (meth)acrylate; a multifunctional acrylate such as trimethylolpropane tri(meth)acrylate, pentaerythritol tri(meth)acrylate, pentaerythritol tetra (meth)acrylate, dipentaerythritol penta(meth)acrylate, dipentaerythritol hexa(meth)acrylate, triglycerol di(meth) acrylate, tripropylene glycol di(meth)acrylate, tetraethylene glycol di(meth)acrylate, pentaerythritol di(meth)acrylate, 1,6-hexanediol di(meth)acrylate, glycerol di(meth)acrylate, tris[2-acryloyloxy)ethyl]isocyanurate, urethane acrylate, glycerol 1,3-diglycerolate di(meth)acrylate or tri(propyleneglycol) glycerolate diacrylate; an alkenyl (meth)acrylate such as vinyl (meth)acrylate or allyl (meth)acrylate; an alkoxy polyalkylene glycol (meth)acrylate such as butoxy triethylene glycol (meth)acrylate; a succinic acid acryloyloxy alkyl ester such as mono-2-(acryloyloxy)ethyl succinate; a (meth)acryloyloxyalkyl (meth)acrylate such as 3-(acryloyloxy)-2-hydroxypropyl (meth)acrylate; a (meth)acrylamide or a derivative thereof such as (meth)acrylamide, diacetone (meth)acrylamide, N-[tris(hydroxymethyl)methyl]acrylamide, N,N-(1,2-dihydroxyethylene)bisacrylamide, N,N-(1,2-dihydroxyethylene)bisacrylamide, or N,N-methylenebis (acrylamide); an acetamidoacrylic acid alkyl ester such as methyl 2-acetamidoacrylate; a triazine substituted with a (meth)acryloyl group or an alkenyl group such as 1,3,5-triacryloylhexahydro-1,3,5-triazine or 2,4,6-triallyloxy-1,3,5-triazine; an isocyanurate substituted with an epoxy group such as tris(2,3-epoxypropyl) isocyanurate; a tetracyanoalkylene oxide such as tetracyanoethylene oxide; a carboxylate substituted with an alkenyl group such as triallyl benzenetricarboxylate; a caprolactone (meth)acryloyloxyalkyl ester such as caprolactone 2-((meth)acryloyloxy)ethyl ester; a maleic acid (meth)acryloyloxyalkyl ester such as mono-2-((meth)acryloyloxy)ethyl malate; a multivalent carboxylic acid, such as 1,2,3-triazol-4,5-dicarboxylic acid; an alkanediol substituted with an alkenyl group such as 3-allyloxy-1,2-propanediol; an alkane substituted with a glycidyloxyphenyl group such as bis[4-(glycidyloxy)phenyl]methane; a dioxalane compound substituted with an alkenyl group such as 2-vinyl-1,3-dioxalane(2-vinyl-1,3-dioxalane); or poly(melamine-co-formaldehyde), and the like, but it is not limited thereto.

The term "(meth)acryl" as used herein may refer to an "acryl" or a "methacryl."

The reactive compound exemplified above may be optionally substituted with at least one substituent.

In one embodiment, the reactive compound may be a multifunctional acrylate. The multifunctional acrylate may be, for example, pentaerythritol triacrylate, dipentaerythritol hexaacrylate, tris[2-(acryloyloxy)ethyl]isocyanurate or urethane acrylate, but it is not limited thereto. An example of the urethane acrylate as described above may be a compound that is commercially available under a trade name such as EB1290, UP135, UP111 or UP128 from Cytec.

In one embodiment, the mixture may include 10 to 1,000 parts by weight or 25 to 400 parts by weight of the reactive compound relative to 100 parts by weight of the photo-alignable polymer. In the above-described weight ratio, the adhesive strength of the liquid crystal layer and the aligning property of the alignment layer may be excellently maintained. Especially, an average tilt angle of the liquid crystal molecules of the liquid crystal layer can be controlled by regulating the weight ratio of the reactive compound within the above-described range as will be described below. For example, if a weight ratio of the reactive compound is controlled to be 25 to 400 parts by weight relative to 100 parts by weight of the photo-alignable polymer, the liquid crystal film may exhibit a suitable effect as a compensation film of the LCD including a TN-liquid crystal panel.

Also, the mixture may further include a photoinitiator. The photoinitiator may include one that can induce a free radical reaction by irradiation of light. The above-described photoinitiator may be, for example, an $\alpha$-hydroxy ketone compound, an $\alpha$-amino ketone compound, a phenyl glyoxylate compound or an oxime ester compound. In one embodiment, the oxime ester compound may be used as the photoinitiator.

The oxime ester compound may exhibit an excellent sensitivity even when light having a weak intensity, for example, ultraviolet rays having a weak intensity, is irradiated, and may have an excellent curing efficiency. Accordingly, the alignment layer of the compound may have an excellent resistance to various organic solvents; prevent erosion between the substrate and the liquid crystal layer; increase an adhesion strength between layers; and induce a stable aligning of liquid crystals. In addition, the photoinitiator may induce a cross-linking reaction of various components as will be described below so that durability of the film can also be improved.

When the mixture includes the photo-alignable polymer, the reactive compound and the photoinitiator, for example, it may include 0.1 to 20 parts by weight or 0.1 to 10 parts by weight of the photo-alignable polymer; 0.1 to 20 parts by weight, 0.1 to 15 parts by weight, or 0.1 to 5 parts by weight of the reactive compound; and 0.01 to 5 parts by weight or 0.01 to 2 parts by weight of the photoinitiator. A good alignment layer may be obtained at a proper thickness within the above-described ratio, and a proper cross-linking reaction may be induced while the aligning property of the alignment layer is maintained within the above-described ratio of the reactive compound to the photoinitiator.

In addition, the mixture may properly include any additive that is known in the art as necessary in addition to the above-described components.

In one embodiment, the reaction product of the mixture may include a photodimerization reaction product of the photo-alignable polymers, and may further include at least one selected from the group consisting of a cross-linking reaction product of the photo-alignable polymers, a cross-linking reaction product of the photo-alignable polymer and the reactive compound, a cross-linking reaction product between the reactive compounds, a cross-linking reaction product of the liquid crystal molecule and the photo-alignable polymer, and a cross-linking reaction product of the liquid crystal molecule and the reactive compound. The cross-linking reaction product of the photo-alignable polymers as described above may include the reaction product prepared through cross-linking of the photo-alignable polymers by the reactive compound, as well as the reaction product prepared through direct cross-linking between the photo-alignable polymers, and also, the cross-linking reaction product of the photo-alignable polymer and the liquid crystal molecules may include the reaction product prepared through cross-linking of the photo-alignable polymer and the liquid crystal molecules via the reactive compound, as well as the reaction product prepared through direct cross-linking of the liquid crystal molecule and the photo-alignable polymer.

The liquid crystal film may exhibit excellent durability by including the above types of the reaction products. The above-described reaction product may be prepared by mixing the reactive compound with the photoinitator in the mixture forming the alignment layer.

Although not limited by theory, for example, in case where the polymer performing the photodimerization reaction, for example, the polymer including the cinnamate moiety, is used as the photo-alignable polymer, by the irradiation of polarized ultraviolet rays, the polymer may be aligned along a direction perpendicular to the polarized direction of the ultraviolet rays. However, some of the above polymers are aligned as described above by the photodimerization reaction, but some of them are remained in a non-reacted or non-aligned state. In the liquid crystal film, the reactive compound and the photoinitiator may be used in order to secure durability and improve an adhesive strength between the alignment layer and the liquid crystal layer and the protective layer for the substrate and the alignment layer by using the non-reacted or non-aligned polymers as described above. If the reactive compound and the photoinitiator are mixed, the cross-linking reaction between the reactive moieties, for example, cinnamate moieties, of the non-reacted or non-aligned polymer and/or the cross-linking reaction between cinnamate moieties and functional groups of the reactive compounds may be induced. In addition, the cross-linking reaction between the liquid crystal molecules of the liquid crystal layers that are closely formed and the cinnamate moieties or the functional groups of the reactive compound may be induced.

A type of the liquid crystal layer that is formed on the alignment layer in the liquid crystal film is not specifically limited.

In one embodiment, the liquid crystal layer may include polymerizable liquid crystal compounds in a polymerization form. For example, the polymerizable liquid crystal compound may form a liquid crystal polymer by being irradiated with light and thus exhibit a nematic or a cholesteric liquid crystal phase.

In one embodiment, the polymerizable liquid crystal compound may be a compound having a functional group capable of being polymerized by irradiation of light, for example, an acrylate group. Specifically, one or a mixture of at least two selected from cyano biphenyl acrylate, cyano phenyl cyclohexane acrylate, cyano phenyl ester acrylate, benzoic acid phenyl ester acrylate, phenyl pyrimidine acrylate, and the like may be used. The above compound is low molecular liquid crystal exhibiting the nematic or cholesteric liquid crystal phase at room temperature or a high temperature.

In one embodiment, the liquid crystal molecules included in the liquid crystal layer may have homogeneous, homeotropic, tilted, splay or cholesteric alignment. In one embodiment, if the liquid crystal molecules have splay-alignment, the average tilt angle thereof may be 20 to 70 degrees. In the specification, the tilt angle of the liquid crystal molecules may refer to an angle formed by any one of the aligned liquid crystal molecules with respect to the surface of the substrate, and an average tilt angle may refer to an angle in case where tilt angles of the total liquid crystal molecules or the array of the total liquid crystal molecules are converted into an average value. As will be described below, the tilt angle may be controlled by controlling a weight ratio of the reactive compound with respect to the photo-alignable polymer the mixture forming the alignment layer. In addition, the average tilt angle may be obtained from retardation values according to angles that may be measured using Axoscan available from Axometrics according to the manufacturer's manual.

For example, the liquid crystal film may be used as a retardation film or a viewing angle compensation film for a display, or a protective film of a polarizer.

In one embodiment, when the liquid crystal film is used as a compensation film in an LCD having a TN-liquid crystal panel, the liquid crystal film or liquid crystal layer may have optical anisotropy and may have an in-plane direction retardation ($R_{in}$) of 20 nm to 200 nm, preferably 20 nm to 180 nm, and more preferably 30 nm to 150 nm.

The in-plane direction retardation as used herein refers to a value calculated from the following Formula 1:

$$R_{in}=(X-Y)\times D \qquad \text{[Formula 1]}$$

In Formula 1, X is a refractive index of the liquid crystal film or liquid crystal layer in an in-plane slow axis direction, and is the refractive index to light having a wavelength of 550 nm; Y is a refractive index of the liquid crystal film or liquid crystal layer in an in-plane fast axis direction, and is the refractive index to light having a wavelength of 550 nm; and D is a thickness of the liquid crystal film or the liquid crystal layer.

The present invention also relate to a method for manufacturing a liquid crystal film. An illustrative method may include forming a protective layer for a substrate on the substrate, forming an alignment layer by applying and reacting a composition for the alignment layer including a photo-alignable polymer dissolved in a solvent on the protective layer, and forming a liquid crystal layer on the alignment layer.

The present invention also relate to a method for controlling an average tilt angle of liquid crystal molecules. An illustrative method may include forming a protective layer for a substrate on the substrate, forming an alignment layer by applying and reacting a composition for the alignment layer including a photo-alignable polymer dissolved in a solvent and a reactive compound having at least one functional group capable of reacting with the photo-alignable polymer on the protective layer for the substrate, and forming a liquid crystal layer on the alignment layer. The method may include controlling the weight ratio of the reactive compound in the composition for the alignment layer so as to be within the range from 10 to 1,000 parts by weight relative to 100 parts by weight of the photo-alignable polymer.

A method for forming the protective layer for the substrate on the substrate as described above is not particularly limited and may be selected according to materials to be used. For example, the layer of the inorganic compound may be formed using a method of depositing the inorganic compound on the substrate. In addition, the layer including the water-soluble polymer may be formed by a method of applying a solution including the polymer and then drying the applied solution, and the layer including the cross-linking product may be formed by applying a coating solution including one of the polyurethane, acrylic compound, acrylic-silicon compound and polyorganosiloxane alone, or with a cross-linker that can crosslink them, and then performing cross-linking, for example, by irradiating with light or applying heat.

In one embodiment, in case where the protective layer for the substrate includes the polymer, for example, the water-soluble polymer, the protective layer for the substrate may be manufactured by preparing a coating solution by dissolving the polymer in suitable solvent, applying the prepared coating solution to the substrate, and then volatilizing the solvent at a proper temperature.

In addition, in another embodiment, in case where the protective layer for the substrate includes a polymerized product of the multifunctional acrylates, the protective layer for the substrate may be manufactured by preparing a coating solution by dissolving the multifunctional acrylates and an initiator that can induce polymerization of the acrylates in suitable solvent, applying the prepared coating solution on the substrate, and then inducing a polymerization reaction of the multifunctional acrylate through irradiation of ultraviolet rays.

In addition, in another embodiment, when the protective layer for the substrate includes a polymerized product of the multifunctional acrylate, the protective layer for the substrate may be manufactured by preparing a coating solution by dissolving the polymer, the multifunctional acrylate, and an initiator that can induce polymerization of the acrylate in a proper solvent, applying the prepared coating solution to a substrate, and then inducing a polymerization reaction of the multifunctional acrylate through drying and irradiation of ultraviolet rays.

The initiator used to form the protective layer for the substrate may include, for example, a thermal or a photo radical initiator that is known in the art. The initiator may be included in an amount of 1 to 100 parts by weight, 1 to 90 parts by weight, 1 to 80 parts by weight, 1 to 70 parts by weight, 1 to 60 parts by weight, 10 to 60 parts by weight, or 10 to 50 parts by weight relative to 100 parts by weight of the multifunctional acrylate in the coating solution for forming the protective layer for the substrate.

The composition for the alignment layer to be applied on the substrate to form the alignment layer may be prepared by dissolving the above-described photo-alignable polymer, the reactive compound and/or radical initiator in suitable solvent. The solvent may include, for example, a conventional organic solvent. The solvent may include, for example, one or at least two of an ether solvent, an aromatic solvent, a halogen solvent, an olefin solvent and a ketone solvent, and specifically, cyclopentanone, cyclo hexanone, chlorobenzene, N-methylpyrrolidone, toluene, xylene, mesitylene, cimene, dimethylsulfoxide, dimethylformamide, chloroform, gamma butyrolactone and tetrahydrofuran.

A method of applying the composition for the alignment layer may include a general coating method, for example, bar coating, comma coating or spin coating. For example, the composition may be applied so as to have a thickness of 800 Å to 5,000 Å.

The applied composition may be dried at a proper temperature, and then irradiated with light to manufacture the alignment layer. In one embodiment, the drying may be performed by maintaining the applied composition for the alignment layer at a temperature of approximately 25° C. to approximately 150° C. for approximately 30 seconds or at least 30 seconds. If the drying temperature is at least 25° C., remaining solvent in the applied layer may be sufficiently dried, thereby preventing spots, and properly maintaining aligning property. In addition, if the drying temperature is 150° C. or less, deformation of the substrate can be prevented.

After drying, irradiation of light, for example, linearly polarized ultraviolet rays, may be performed to manufacture the alignment layer. For example, light may be irradiated for at least 0.5 seconds. The photo-alignable polymer may be aligned by the photodimerization reaction and also the various cross-linking reactions described above may be induced according to the irradiation of light. The irradiation of linearly polarized ultraviolet rays may be performed using a wire grid polarizing plate. In the process, a polarization direction of ultraviolet rays may be controlled so as to regulate an aligning direction and therefore, the optical axis of the polymerizable liquid crystal compound to be applied may be controlled according to the purpose.

In one embodiment, the linearly polarized ultraviolet rays may be irradiated at a radiation intensity of approximately 200 mJ/cm$^2$ or less, approximately less than 200 mJ/cm$^2$, approximately 190 mJ/cm$^2$ or less, approximately 180 mJ/cm$^2$ or less, approximately 170 mJ/cm$^2$ or less, or approximately 160 mJ/cm$^2$ or less. In the liquid crystal film, erosion and swelling of the substrate may be prevented from being generated by the protective layer for the substrate as described above, and therefore, a suitable liquid crystal aligning property may be secured even by irradiation of ultraviolet rays within the above-described range of radiation intensity.

The liquid crystal layer may be formed by applying a liquid crystal composition including a polymerizable liquid crystal compound on the alignment layer, and then aligning and polymerizing the liquid crystal compound. The liquid crystal composition may be prepared by dissolving the polymerizable liquid crystal compound in a proper solvent. Specifically, the liquid crystal composition may be prepared by dissolving the polymerizable liquid crystal compound and a photoinitiator in a solvent. The polymerizable liquid crystal compound in the liquid crystal composition may be included in an amount of 5 to 70 parts by weight, and more preferably 5 to 50 parts by weight relative to 100 parts by weight of the total liquid crystal composition. If the weight ratio of the polymerizable liquid crystal compound is not less than 5 parts by weight, spots may be prevented, and if it is 70 parts by weight or less, extraction of the polymerizable liquid crystal compound may be prevented.

An amount of the photoinitiator in the liquid crystal composition may be 3 to 10 parts by weight relative to 100 parts by weight of the polymerizable liquid crystal compounds. If a weight ratio of the photoinitiator is at least 3 parts by weight, sufficient curing may be induced when light is irradiated, and if it is 10 parts by weight or less, aligning of the liquid crystal molecules may be properly induced.

The liquid crystal composition may further include a chiral agent, a surfactant, a polymerizable monomer, a polymer, and the like within a range not interfering with aligning of the liquid crystal molecules in addition to the above-described components.

When the liquid crystal composition is prepared, the solvent such as a halogenated hydrocarbon such as chloroform, tetrachloroethane, trichloroethlene, tetrachloroethylene or chlorobenzene; an aromatic hydrocarbon such as benzene, toluene, xylene, mesitylene, cimene, methoxy benzene, or 1,2-dimethoxybenzene; a ketone such as acetone, methylethylketone, cyclohexanone or cyclopentanone; an alcohol such as isopropyl alcohol or n-butanol; or a cellosolve such as methyl cellosolve, ethyl cellosolve or butyl cellosolve may be used.

The liquid crystal composition including the polymerizable liquid crystal compound may be applied to the alignment layer; dried; aligned; and then polymerized. The drying may be performed at a temperature of approximately 25° C. to 120° C. for at least 1 minute. The drying temperature may be a factor that can affect aligning of the liquid crystal; induce proper aligning of the liquid crystal molecules within the above-described range; and prevent spots.

After drying, light, for example, ultraviolet rays may be irradiated on the applied layer to polymerize the liquid crystal compound. The polymerization may be performed under presence of a photoinitiator absorbing a wavelength of the UV region. In addition, a cross-linking reaction may be induced in the above-described alignment layer by irradiation of light.

The irradiation of ultraviolet rays may be performed in the air or under a nitrogen atmosphere with blocking oxygen in order to increase reaction efficiency. As an UV irradiator, a metal halide lamp, a high or a medium pressure mercury UV lamp having an intensity of 80 w/cm or more may be used. If necessary, a cold minor or other cooling system may be installed between a substrate and a UV lamp so as for a surface temperature of the liquid crystal layer to be a range having a liquid crystal state when ultraviolet rays are irradiated.

Also, in the method for controlling the average tilt angle, the ratio of the reactive compound in the composition for the alignment layer to be applied to form the alignment layer may be changed within the range of 10 to 1,000 parts by weight, and preferably, 25 to 400 parts by weight relative to 100 parts by weight of the photo-alignable polymer.

According to the above method, through a simple method of controlling the ratio of the reactive compound to the photo-alignable polymer, optical properties of the liquid crystal film may be controlled within a wide range.

For example, if the ratio of the reactive compound to the photo-alignable polymer is decreased, the average tilt angle of the liquid crystal molecules may be decreased, and if the ratio is increased, the average tilt angle of the liquid crystal molecules may be increased. Although not limited in theory, for example, the photo-alignable polymer may align the liquid crystal molecules by an interaction between the photo-dimerization reaction product of the photo-alignable polymer and the liquid crystal molecules, and forces fixing the liquid crystal molecules may be changed according to the ratio of the photodimerization reaction product of the photo-alignable polymer. Accordingly, it is considered that the ratio of the photo-alignable polymer or the photodimerization reaction product thereof on the surface of the alignment layer may be controlled by adjusting the ratio of the reactive compound, thereby controlling the average tilt angle of the liquid crystal molecules.

The present invention also relates to a liquid crystal display device (LCD). An illustrative LCD may include the liquid crystal film.

The liquid crystal film may be useful as an optical compensation layer for an LCD, and thus may be included in the LCD as the optical compensation layer. In addition, the film may be used, for example, as λ/2 wave plate, λ/4 wave plate, a reverse wavelength dispersion film, an optical compensation film, a color filter, a multilayer film with a polarizer or a polarizing plate, a compensation film for a polarizing plate or a retardation film for a super twist nematic (STN) LCD, a thin film transistor-twisted nematic (TFT-TN) LCD, a vertical alignment (VA) LCD or an in-plane switching (IPS) LCD.

An illustrative LCD including the liquid crystal film will be illustrated as follows.

That is, the LCD may include a liquid crystal panel, and first and second polarizing plates that are each arranged on respective sides of the liquid crystal panel, and the liquid crystal film may be arranged between the liquid crystal panel and the first polarizing plate and/or between the liquid crystal panel and the second polarizing plate.

The first and/or second polarizing plates may include a protective film on one or both sides thereof. The protective film may be a TAC film, a polynorbornene film prepared from a ring opening metathesis polymerization (ROMP), a polymer of a ring opening metathesis polymerization followed by hydrogenation (HROMP) prepared by adding another hydrogen atom to a cycloolefin polymer (COP), a polyester film, a polynorbornene film prepared by additional polymerization, and may also be a film prepared from a transparent polymer material, but it is not limited thereto.

In one embodiment, the liquid crystal film may be useful in an LCD including a TN mode-liquid crystal panel.

The present invention also relates to a polarizing plate including a polarizer; and a liquid crystal film formed on one or both sides of the polarizer.

The liquid crystal film in the polarizing plate may serve as a protective film or a compensation film, and preferably, as a protective film.

When the polarizing plate is applied to the liquid crystal film, the substrate or the liquid crystal layer of the film may contact the polarizer.

In addition, in another embodiment, the liquid crystal film may be arranged on only one side of the polarizer, and another optical film or protective film that is known in the art may be arranged on the other side.

The polarizer may be, for example, a polyvinyl alcohol polarizer that is absorbed and aligned with iodine or a dichroic dye.

The polarizer and liquid crystal film may be laminated by a general method. For example, a method of attaching a protective film to a polarizer using an adhesive or pressure-sensitive adhesive may generally be used. According to the above method, the adhesive or pressure-sensitive adhesive may be coated on a proper side of the polarizer or the liquid crystal film using a roll coater, a gravure coater, a bar coater, a knife coater or a capillary coater, and then the film and the polarizer may be laminated by hot-pressing or room temperature-pressing using a laminating roll and the adhesive or pressure-sensitive adhesive as a mediator. When a hot melt adhesive is used, a hot-pressing roll may be used.

The adhesive or pressure-sensitive adhesive may be a one-component or two-component PVA adhesive, a polyurethane adhesive, an epoxy adhesive, a styrene butadiene rubber (SBR) adhesive, or a hot melt adhesive, but it is not limited thereto.

When the polyurethane adhesive is used, it is preferable to use a polyurethane adhesive prepared using an aliphatic isocyanate compound that is not yellowed by light. When the one-component or two-component adhesive for dry laminating or an adhesive with a relatively low reactivity with respect to an isocyanate and a hydroxyl group is used, a solution adhesive that is diluted with an acetate solvent, a ketone solvent, an ether solvent, or an aromatic solvent may also be used.

A viscosity of the adhesive or pressure-sensitive adhesive may preferably be a low viscosity of 5,000 cps or less. Preferably, the adhesives have excellent storage stability and also have an optical transmittance at 400 to 800 nm of at least 90%.

The pressure-sensitive adhesive may have improved mechanical strength as an adhesive level through sufficiently curing by heat or ultraviolet rays after lamination, and also have a sufficiently high interface adhesive strength such that it cannot be detached without destruction of any one of both films attached with the adhesive.

The pressure-sensitive adhesive may include a natural rubber, a synthetic rubber, or an elastomer with excellent optical transparency, a copolymer of vinyl chloride/acetic acid vinyl, polyvinylalkylether, polyacrylate or a modified polyolefin adhesive agent, or a curing adhesive agent, in which a curing agent such as an isocyanate, is added.

Another aspect of the present invention provides an LCD including the polarizing plate.

For example, the polarizing plate may be used as a first or second polarizing plate in the above-described device.

BRIEF DESCRIPTION OF THE DRAWINGS

FIG. 1 shows a schematic of an illustrative embodiment of a liquid crystal film.

EXPLANATIONS OF THE MARKS IN THE FIGURES

1: a liquid crystal film
11: a substrate
12: a protective layer for the substrate
13: an alignment layer
14: a liquid crystal layer

DETAILED DESCRIPTION OF EXEMPLARY EMBODIMENTS

Hereinafter, the liquid crystal film will be described in further detail through Examples and Comparative Examples, but the range of the liquid crystal film will not be limited to the following Examples.

Preparation Example 1

Preparation of Composition for a Protective Layer for a Substrate

A composition for forming a protective layer for a substrate was prepared by dissolving poly(vinyl alcohol) having a weight average molecular weight of approximately 50,000 and a degree of saponification of at least approximately 80%, pentaerythritol triacrylate and a photoinitiator (4-(2-hydroxyethoxy)phenyl-(2-hydroxy-2-propyl)ketone, Irgacure 2959) in solvent prepared by mixing water and ethanol at a volume ratio of 1:1. The concentrations of the poly(vinyl alcohol), the pentaerythritol triacrylate and the photoinitiator in the solvent were 2 weight %, 1 weight %, and 0.25 weight %, respectively.

Examples 1 to 4

Formation of Protective Layer for the Substrate

A liquid crystal film was prepared by using a polycarbonate film as a substrate. Specifically, the above-prepared composition for the protective layer for the substrate was applied to the substrate, and then dried at 80° C. for 2 minutes. Afterward, a protective layer was formed by irradiating it with ultraviolet rays at a radiation intensity of approximately 200 mJ/cm$^2$.

Formation and Alignment of Alignment Layer

Subsequently, a coating solution for an alignment layer was prepared by dissolving 20 g of 5-norbornene-2-methyl-(4-methoxy cinnamate) as the photo-alignable polymer, 20 g of dipentaerythritol hexaacrylate as the reactive compound, and 5 g of a photoinitiator (Irgacure OXE02 available from Ciba-Geigy (Switzerland)) in 980 g of cyclopentanone. The coating solution was applied to the protective layer for the substrate so as for its thickness to be approximately 1,000 Å after drying, and then dried by hot air in a drying oven at 80° C. for 2 minutes. After drying, aligning properties were given by irradiation of a linearly polarized UV at an intensity of 50 mJ/cm$^2$ (Example 1), 100 mJ/cm$^2$ (Example 2), 150 mJ/cm$^2$ (Example 3), and 200 mJ/cm$^2$ (Example 4) in a direction perpendicular to a direction of moving the film through a wire grid polarizing plate (available from Moxteck) using a high pressure mercury lamp as a light source.

Formation of Liquid Crystal Layer

A polymerizable liquid crystal coating solution was prepared by dissolving a mixture of 95 parts by weight of a polymerizable liquid crystal compound (available from Merck) that can be homogeneously aligned, including cyanobiphenyl acrylate, cyano phenyl cyclohexane acrylate, and cyano phenyl ester acrylate and 5 parts by weight of a photoinitiator (Irgacure 907, available from Ciba-Geigy (Switzerland)) was dissolved in a solvent, toluene, to have a solid content of 25 parts by weight relative to 100 parts by weight of the total solution. The prepared liquid crystal coating solution was applied to the aligned alignment layer so as for its thickness to be 1 μm after drying, and then dried by hot air in a drying oven at 60° C. for 2 minutes. Then, a liquid crystal film was manufactured by curing the above-mentioned layer through irradiation of non-polarized UV using a high pressure mercury lamp (80 w/cm). The manufactured liquid crystal film was a laminated optical film including the polycarbonate film, the protective layer for the substrate formed on the film, the alignment layer formed on the protective layer, and the liquid crystal layer formed on the alignment layer.

Comparative Examples 1 to 3

Liquid crystal films of Comparative Examples 1 to 3 were manufactured according to the following order using the same methods as described in Examples 1 to 3, respectively, except that the protective layer for the substrate was not formed on the polycarbonate substrate.

Formation and Alignment of Alignment Layer

A coating solution for an alignment layer was prepared by dissolving 20 g of 5-norbornene-2-methyl-(4-methoxy cinnamate) as a photoreactive polymer, 20 g of dipentaerythritol hexaacrylate as a reactive compound, and 5 g of a photoinitiator (Irgacure OXE02, available from Ciba-Geigy (Switzerland)) in 980 g of cyclopentanone. Then, the coating solution was applied to the polycarbonate substrate that was the same as that of Example to a thickness of approximately 1,000 after drying, and then dried by hot air in a drying oven at 80° C. for 2 minutes. After drying, aligning properties were given by irradiation of linearly polarized UV at an intensity of 50 mJ/cm$^2$ (Comparative Example 1), 100 mJ/cm$^2$ (Comparative Example 2), and 150 mJ/cm$^2$ (Comparative Example 3) in a direction perpendicular to a direction of moving the film through a wire grid polarizing plate (available from Moxteck) using a high pressure mercury lamp as light source.

Formation of Liquid Crystal Layer

A polymerizable liquid crystal coating solution was prepared by dissolving a mixture that was mixed with 95 parts by weight of a polymerizable liquid crystal compound (available from Merck) that can be plane-aligned, including cyanobiphenyl acrylate, cyano phenyl cyclohexane acrylate, and cyano phenyl ester acrylate and 5 parts by weight of a photoinitiator (Irgacure 907, available from Ciba-Geigy (Switzerland)) in a solvent, toluene to be 25 parts by weight of the solid relative to 100 parts by weight of the total solution. The prepared liquid crystal coating solution was applied to the aligned alignment layer to a thickness of 1 μm after drying, and then dried by hot air in a drying oven at 60° C. for 2 minutes. Afterward, a liquid crystal film was manufactured by curing the above-mentioned layer through irradiation of non-polarized ultraviolet rays using a high pressure mercury lamp (80 w/cm). The manufactured liquid crystal film was a laminated optical film including a polycarbonate film, a protective layer for the substrate formed on the film, an alignment layer formed on the protective layer, and a liquid crystal layer formed on the alignment layer.

Experimental Example 1

Evaluation of Liquid Crystal Aligning Property

The aligning properties of the liquid crystal films prepared from Examples 1 to 4 and Comparative Examples 1 to 3 were evaluated and the results are shown in the following Tables 1 and 2.

The aligning properties were evaluated by observing retardations and uniformities, which were expressed by the liquid crystal film while the liquid crystal film was disposed between two polarizers, in which light absorption axes were arranged perpendicular to each other, and then light was irradiated to one side. According to the above method, they were evaluated as follows: X=no alignment is performed; Δ=alignment with slight deviation is performed; ○=alignment without deviation is performed.

TABLE 1

|  | Example 1 | Example 2 | Example 3 | Example 4 |
|---|---|---|---|---|
| UV intensity when alignment layer is aligned (Unit: mJ/cm$^2$) | 50 | 100 | 150 | 200 |
| Liquid crystal aligning property | ○ | ○ | ○ | ○ |

TABLE 2

|  | Comp. Ex. 1 | Comp. Ex. 2 | Comp. Ex. 3 |
|---|---|---|---|
| UV intensity when an alignment layer is aligned (Unit: mJ/cm$^2$) | 50 | 100 | 150 |
| Liquid crystal aligning property | X | X | X |

As seen from the results of Tables 1 and 2, in the cases of Examples 1 to 4 in which the protective layer for the substrate was formed, the liquid crystal was effectively aligned even when ultraviolet rays with low radiation intensity was irradiated to form the alignment layer due to effective protections against the corrosiveness and swelling of the substrate. In contrast, in the cases of Comparative Examples 1 to 3 in which the protective layer for the substrate was not formed, even when the intensity of polarized ultraviolet rays to be irradiated was increased because the corrosiveness and swelling of the substrate were largely generated, cross-linking was not sufficient according to the irradiation as described above and also the swelling due to the liquid crystal coating solution to be applied on the alignment layer was further generated and thus the liquid crystal aligning property was largely deteriorated.

The present invention provides a liquid crystal film that has excellent physical properties, such as durability and an optical physical property, and thus may be effectively used for various applications. In addition, the physical properties of the liquid crystal film according to the present invention may be freely controlled according to desired purposes.

What is claimed is:

1. A liquid crystal film, comprising:
   a substrate;
   a protective layer that comprises at least one water-soluble polymer selected from the group consisting of poly(vinyl alcohol), polyurethane, acrylate polymer, poly(ethylene glycol), a poly(ethylene vinyl alcohol) copolymer, dextrin, poly(vinylpyrrolidone), cellulose derivative, and pyrrolidone-vinylacetate copolymer; and further comprises a polymerized product of multifunctional acrylate compounds in an amount of 1 to 300 parts by weight relative to 100 parts by weight of the water-soluble polymer, for the substrate on the substrate;
   an alignment layer that comprises a photo-alignable polymer and is presented on the protective layer for the substrate; and
   a liquid crystal layer that comprises liquid crystal molecules and is presented on the alignment layer,
   wherein the multifunctional acrylate compound is a compound including at least two of acrylic groups or methacrylic groups.

2. The liquid crystal film of claim 1, wherein the substrate is a cellulose substrate; a cyclic olefin polymer substrate; an acrylic substrate; a polycarbonate substrate; a polyolefin substrate; a polyvinyl alcohol substrate; a polyethersulfone substrate; a polyetheretherketone substrate; a polyetherimide substrate; a polyethylene naphthalate substrate; a polyester substrate; a polyimide substrate; a polysulfone substrate; or a fluoro polymer substrate.

3. The liquid crystal film of claim 1, wherein the substrate is a polycarbonate substrate.

4. The liquid crystal film of claim 1, wherein the photo-alignable polymer exhibits a liquid crystal aligning property by a photodimerization reaction induced by irradiation of polarized ultraviolet rays.

5. The liquid crystal film of claim 1, wherein the photo-alignable polymer comprises a unit represented by the following Formula 3:

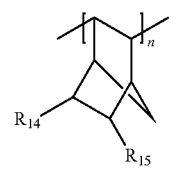

[Formula 3]

wherein n is a number from 50 to 5,000; and
$R_{14}$ and $R_{15}$ are independently hydrogen, a halogen, an alkyl group, or a moiety represented by the following Formula 4, with the proviso that at least one of $R_{14}$ and $R_{15}$ is a moiety represented by the following Formula 4:

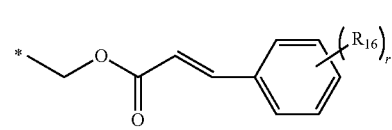

[Formula 4]

wherein $R_{16}$ is independently hydrogen, a halogen, an alkyl group, an alkoxy group, or an allyloxy group; and r is a number of $R_{16}$, which is substituted in the benzene ring, and is a number from 1 to 5.

6. The liquid crystal film of claim 1, wherein the alignment layer is a reaction product of a mixture comprising the photo-alignable polymer and a reactive compound comprising at least one functional group capable of reacting with the polymer.

7. The liquid crystal film of claim 6, wherein the functional group of the reactive compound is an alkenyl group, an epoxy group, a cyano group, a carboxyl group, an acryloyl group, or a methacryloyl group.

8. The liquid crystal film of claim 6, wherein the reactive compound comprises at least two functional groups capable of reacting with the photo-alignable polymer and has a molecular weight or a weight average molecular weight in the range from 200 to 5,000.

9. The liquid crystal film of claim 6, wherein the mixture further comprises a photoinitiator.

10. The liquid crystal film of claim 9, wherein the photoinitiator is an oxime ester compound.

11. The liquid crystal film of claim 6, wherein the reaction product comprises a photodimerization reaction product of the photo-alignable polymers, and also comprise at least one selected from the group consisting of a cross-linking reaction product of the photo-alignable polymers, a cross-linking reaction product of the photo-alignable polymer and the reactive compound, a cross-linking reaction product between reactive compounds, a cross-linking reaction product of the liquid crystal molecule and the photo-alignable polymer, and a cross-linking reaction product of the liquid crystal molecule and the reactive compound.

12. The liquid crystal film of claim 1, wherein the liquid crystal molecules have homogeneous alignment, homeotropic alignment, tilted alignment, splay alignment, or cholesteric alignment.

13. The liquid crystal film of claim 12, wherein the liquid crystal molecules having the splay alignment have an average tilt angle from 20 to 70 degrees.

14. A liquid crystal display device comprising the liquid crystal film of claim 1.

15. A polarizing plate, comprising:
   a polarizer; and the liquid crystal film of claim 1 formed on one or both sides of the polarizer.

* * * * *